A. W. SMITH.
TYPE WRITING MACHINE.
APPLICATION FILED DEC. 11, 1901.

990,306.

Patented Apr. 25, 1911.

6 SHEETS—SHEET 2.

Witnesses:

Inventor:
Arthur W. Smith
by Jacob Felbel
His Attorney

A. W. SMITH.
TYPE WRITING MACHINE.
APPLICATION FILED DEC. 11, 1901.

990,306.

Patented Apr. 25, 1911.
6 SHEETS—SHEET 5.

Witnesses:
K. V. Klonovan
Charles Smith

Inventor:
Arthur W. Smith
by Jacob Felbel
His Attorney

A. W. SMITH.
TYPE WRITING MACHINE.
APPLICATION FILED DEC. 11, 1901.
990,306.
Patented Apr. 25, 1911.
6 SHEETS—SHEET 6.
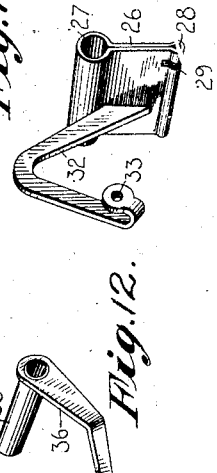
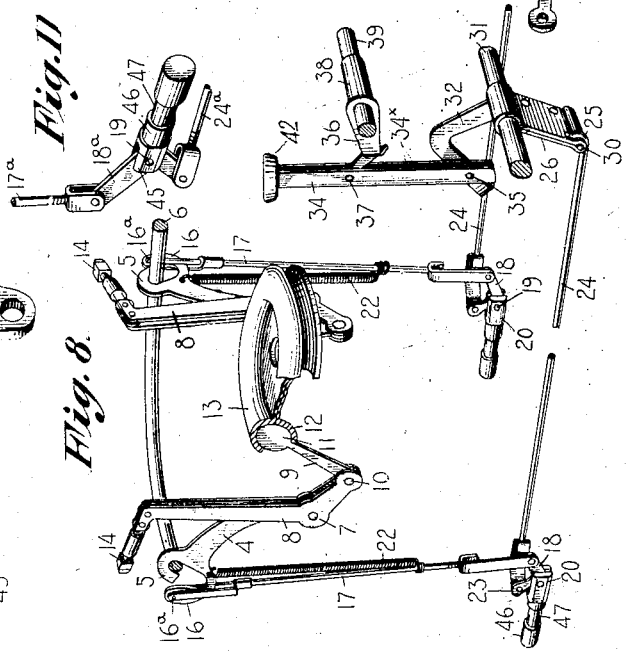
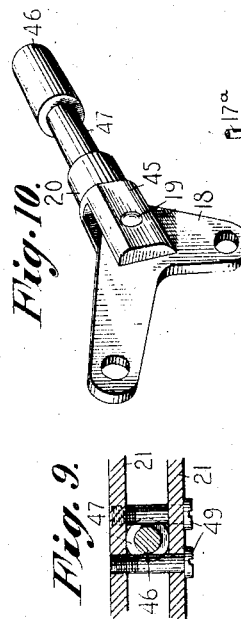
WITNESSES.
K. V. Donovan.
Charles E. Smith.
INVENTOR
Arthur W. Smith
by Jacob Felbel
HIS ATTORNEY.

UNITED STATES PATENT OFFICE.

ARTHUR W. SMITH, OF JERSEY CITY, NEW JERSEY, ASSIGNOR TO YOST WRITING MACHINE COMPANY, OF ILION, NEW YORK, A CORPORATION OF NEW YORK.

TYPE-WRITING MACHINE.

990,306.

Specification of Letters Patent. Patented Apr. 25, 1911.

Application filed December 11, 1901. Serial No. 85,451.

*To all whom it may concern:*

Be it known that I, ARTHUR W. SMITH, citizen of the United States, and resident of Jersey City, in the county of Hudson and State of New Jersey, have invented certain new and useful Improvements in Type-Writing Machines, of which the following is a specification.

My present invention relates to typewriting machines and the object of said invention is to improve more particularly the type-bar mechanism and other related parts, such as the connections and mountings, all as will hereinafter more fully appear.

To these ends the invention consists in the novel features of construction and arrangements and combinations of parts as hereinafter described and particularly pointed out in the appended claims.

Figure 1:
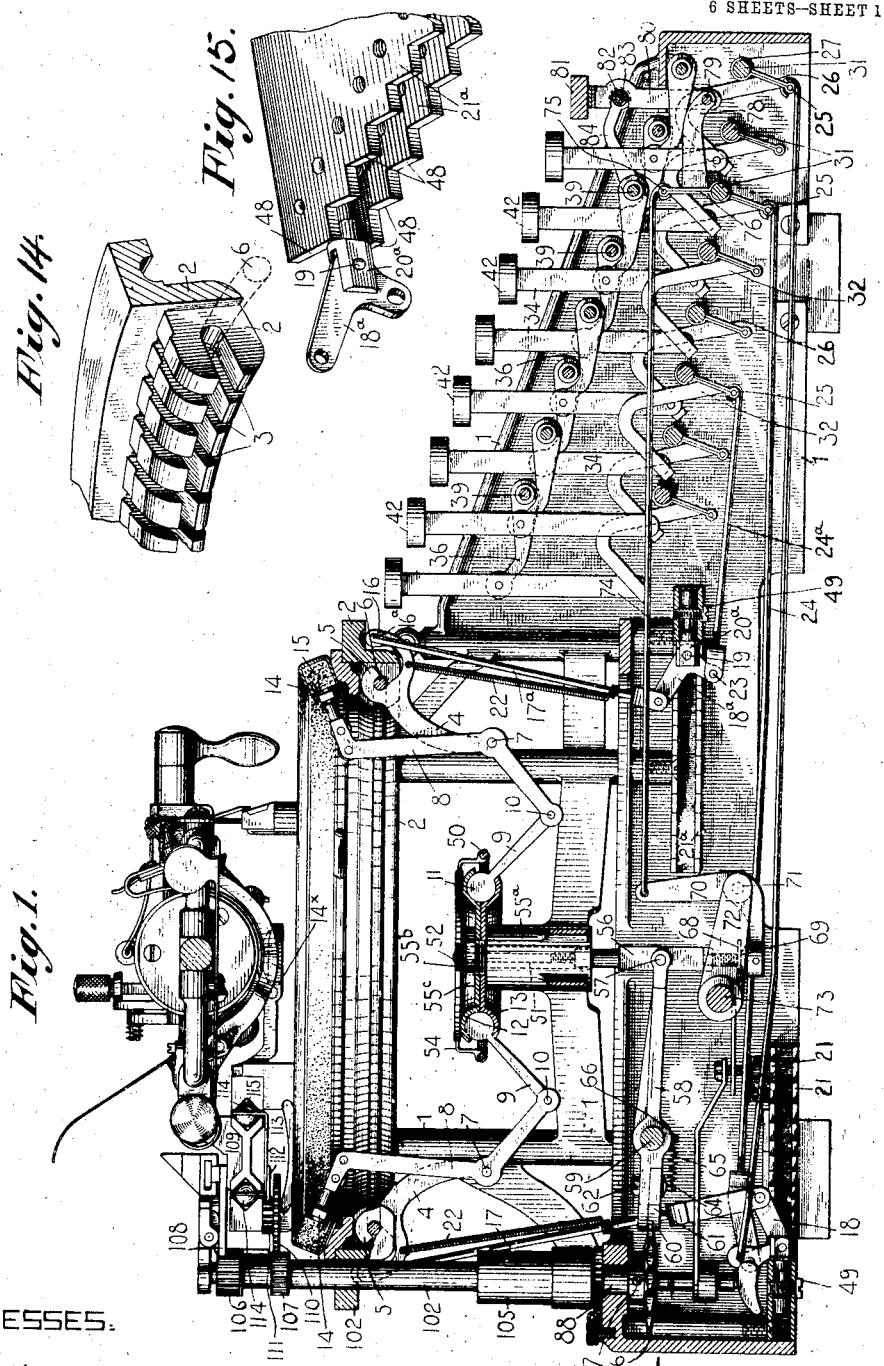
Figure 2:
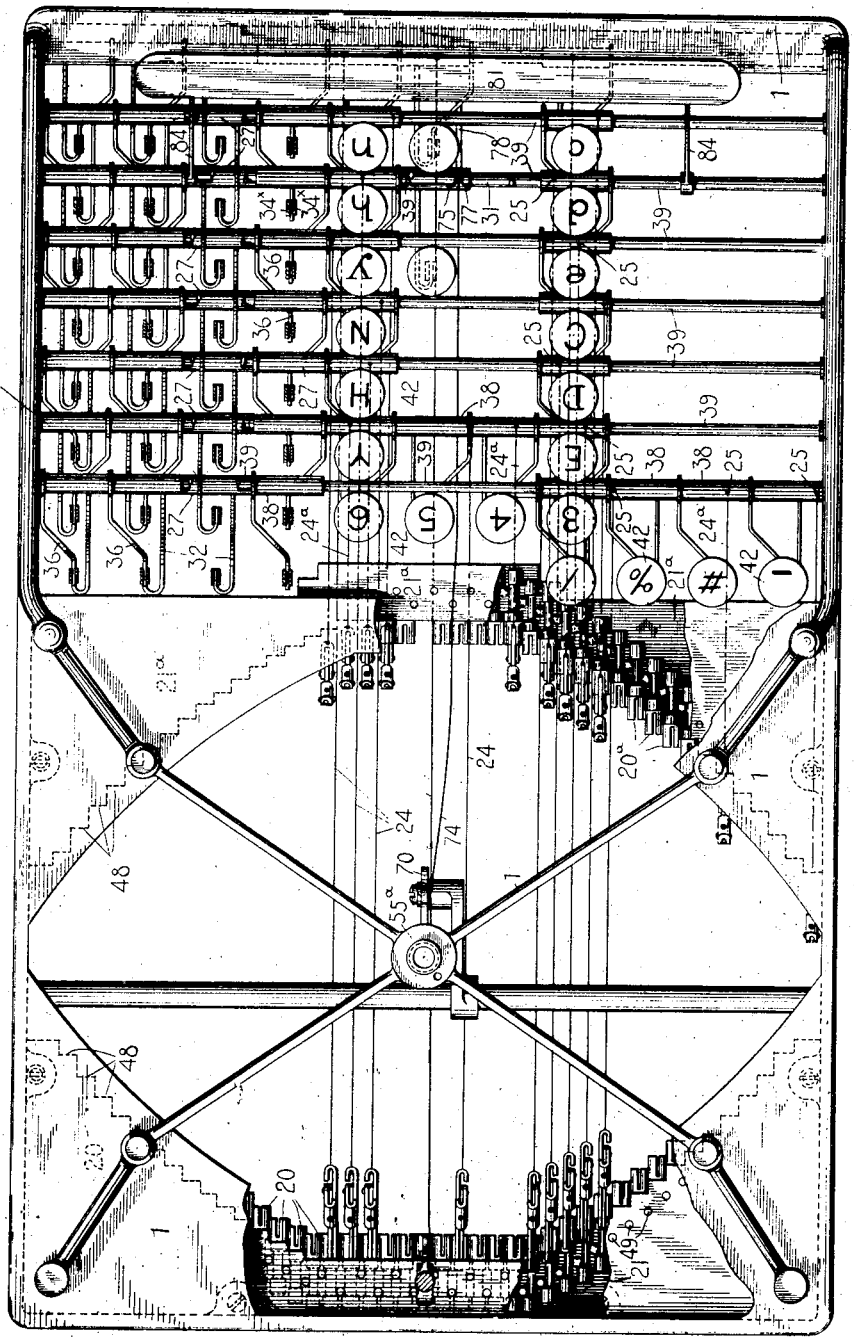
Figure 3:
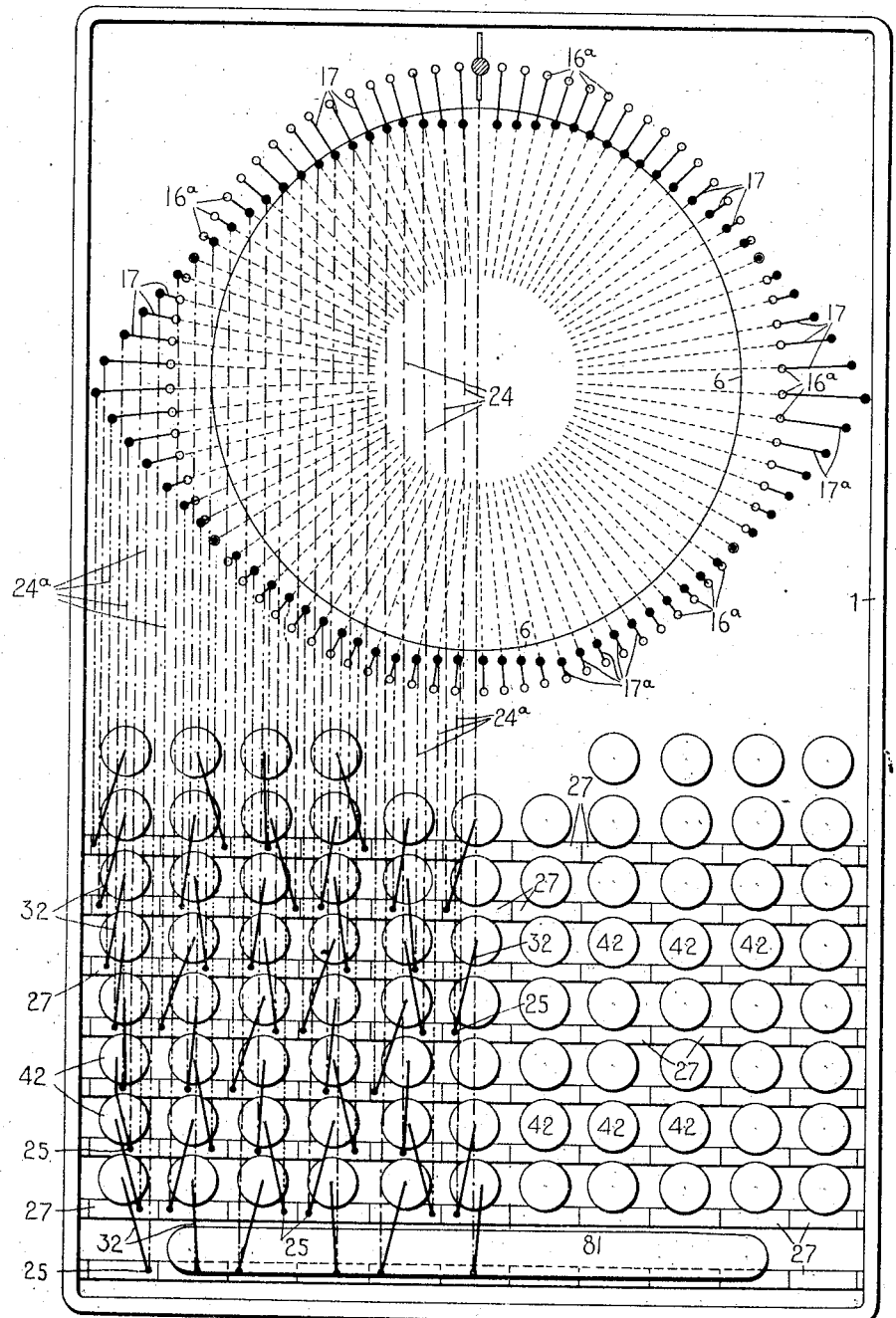
Figure 4:
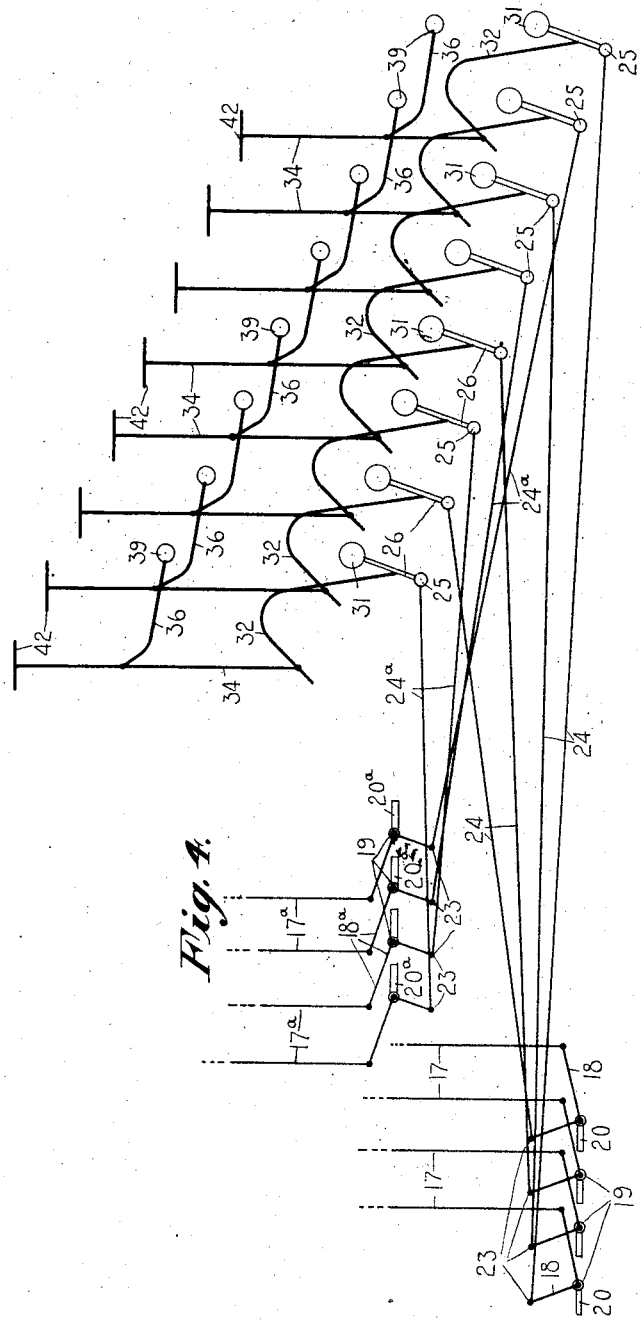
Figure 5:
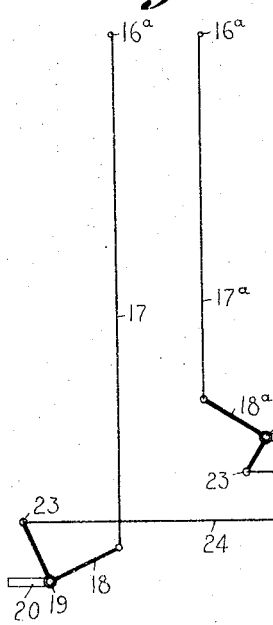
Figure 6:
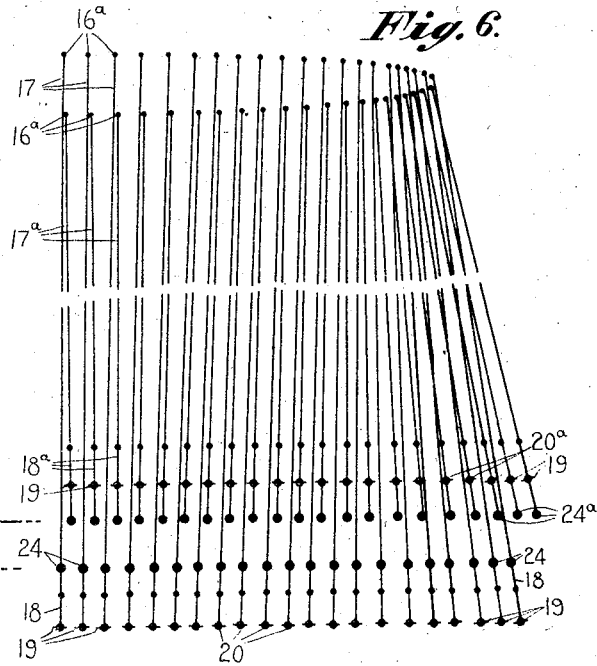
Figure 7:
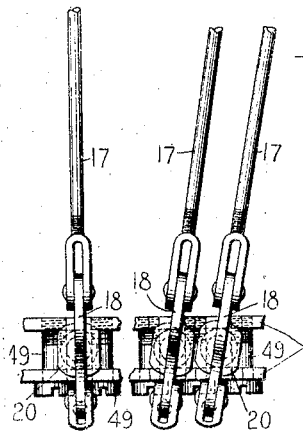
Figure 16:
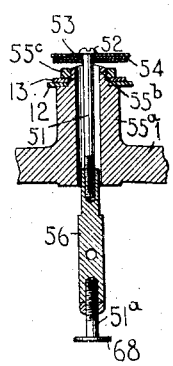

In the accompanying drawings, wherein like reference characters represent corresponding parts in the various views:—Figure 1 is a vertical sectional view of one form of typewriting machine embodying the invention, the section being taken from front to rear of the machine. Fig. 2 is a plan view of the keyboard and base portion of the machine with certain portions broken away and others in section to show the key arrangement and draw link and bell crank connections. Fig. 3 is a diagrammatic plan view of the type carrier actuating means, the type carriers being omitted. Fig. 4 is a detail diagrammatic side view of the same. Fig. 5 is a diagrammatic side view of a portion of a front and a rear type action. Fig. 6 is a diagrammatic front view of portions of various of the type actions, the upper ends of the connecting rods being shown in perspective for the sake of clearness, and to illustrate that the connecting rods or links and the bell cranks of each type action work in a single plane. Fig. 7 is an enlarged detail end view of several hangers and some of their associated parts; the view illustrating the different dispositions of the hangers at different portions of the machine. Fig. 8 is a detail perspective view of two of the type actions. Fig. 9 is a transverse detail sectional view showing the mode of mounting the bell-crank hangers. Fig. 10 is a perspective view of one of the hangers and a bell crank lever connected thereto. Fig. 11 is a detail perspective view of a hanger and certain of the operating parts connected thereto. Fig. 12 is a detail perspective view of one of the supporting arms or links for the key stems. Fig. 13 is a detail perspective view of one of the actuating levers with its projecting arm. Fig. 14 is a fragmentary detail perspective view of the mounting ring for the drivers of the type carriers. Fig. 15 is a fragmentary detail perspective view of the segmental clamping plates which support the hangers, the view illustrating a hanger and attached bell crank in place. Fig. 16 is a detail fragmentary vertical sectional view of the universal ring and its connections.

In the various figures of the drawings, parts have been omitted and other parts broken away to more clearly illustrate other portions of the structure.

The improvements which constitute the subject-matter of the present invention are shown in their application to that type of machines which is known as the "Yost" machine, though obviously some of the features of invention may be applied to any character of typewriting machines, wherein they may be found available.

Referring now to the drawings, 1 indicates the frame of the machine which supports a type ring 2 provided with radial slots 3 (Fig. 14) for the reception of arms or drivers 4, each driver having a hook-like projection 5, which bears upon a fulcrum ring 6 arranged in a groove in the type ring or support 2. One end of each driver is pivotally connected at 7 to a type bar or carrier 8. A guide link 9 is pivotally connected at 10 to another portion of said type bar or carrier and said guide link is formed at its pivotal end with a disk-like portion 11 which is held in recesses or bearings formed by a pair of circular plates 12 and 13 suitably clamped together and supported centrally of the type bar system. The faces of the types 14 on the various type bars normally rest against an inking pad 15 which is supported on the type ring 2. The driver 4 of each type bar or carrier is provided with an extension 16 to which is connected at 16ᵃ the upper end of a draw link or pull rod 17 or 17ᵃ, all of the draw links marked 17 being arranged at the rear half of the type bar mechanism and all of the draw links 17ᵃ being arranged at the front half or portion of said mechanism. The lower end of each draw-link 17 or 17ᵃ is operatively connected to a bell crank lever 18 or 18ª that is pivoted at 19 to a hanger 20 or 20ª, which in turn is secured between clamping plates 21 or 21ª.

The bell cranks 18, hangers 20 and plates 21 are located at the rear portion and the bell cranks 18ª, hangers 20ª and clamping plates 21ª are located at the front portion of the type bar system. Each driver 4 and the draw link 17 or 17ª thereof is connected by a contractile spring 22 in order to restore the type bar and its connected parts to their normal positions. Each bell crank lever 18 or 18ª has one arm thereof operatively connected at 23 to a draw link 24 or 24ª, which has a general horizontal disposition and which is connected at its opposite end 25 to an actuating lever 26. Each of the actuating levers 26 is preferably formed of a tube which is flattened throughout a portion of its extent, as illustrated in Figs. 1, 8 and 13, so that each lever constitutes in a sense an endless band which is provided with elongated bearings 27 and 28 therein.

From an examination of Fig. 8, it will be observed that each actuating lever 26 is considerably wider than the draw link 24 or 24ª at the point of connection 25 with said link. This construction enables all of the actuating levers 26 to be formed alike and the links 24 or 24ª to be connected to said levers 26 at varying points in the width thereof, as determined by the widthwise disposition of the links, it being merely necessary to provide a saw cut or slot 29 (Fig. 15) in each lever 26 at the point where it is desired to connect the link therewith. This construction permits the draw links to be properly spaced and connected, so that contact or interference of one link with another is avoided. The looped end 25 of the link is inserted in the cut or slot 29 and a pin 30 is passed through the elongated bearing 28 so as to pivotally unite the link and lever. The various levers 26 are arranged in transverse rows which are at different heights, and a pivotal or supporting rod 31 passes through the tubular elongated bearings 27 in the various levers 26 of each row, the pivotal rod being secured at its ends to the side plates or frame of the machine.

From an examination of Fig. 2, it will be observed that the bearings 27 of the various levers 26 of each row are close together or in contact one with another so that no separating or spacing means between the various levers need be provided. From each of the levers 26 projects an arm 32 which is perforated at 33 and bent at its end so as to project around and between the plates 34ˣ of a key-stem 34. A rivet 35 uniting said plates passes through said perforation 33 and constitutes a pivotal connection between the arm 32 and the key-stem. Each key-stem may in a like manner be connected to a second guide arm 36 by a rivet 37 and which arm is preferably provided with an elongated bearing 38 that is supported upon a rod 39, which likewise extends across from side to side of the machine and is secured at its ends to the side plates thereof. Thus the arms 36 of each row are supported upon a single rod 39 in substantially the same manner that the levers 26 are supported upon their rods 31. The bearings 38 of the arms 36 likewise constitute spacing means for maintaining the proper distance between the various arms 36.

From an examination of Figs. 1, 4 and 8, it will be observed that the arms 32 and 36, connected to each key-stem, are pivoted at the same distance from their pivotal rods 31 and 39, respectively, so that the arms 32 and 36 constitute in effect parallel links for supporting an intermediate link or key-stem 34 and maintaining it in a substantially vertical position both when at rest and at the time of depression to operate the type bar. By this arrangement the key stem is supported and guided by freely swinging links which afford an easy and free action to the key and avoid objectionable friction present in prior constructions wherein the key stem is arranged to slide in perforations in fixed guide pieces, the pivots 35, 37, 31 and 39 constituting in effect four axes or pivots on which a key stem is mounted, two of the axes 31 and 39 being fixed and arranged one above the other in the same vertical plane, said plane being parallel to a vertical plane in which the axis of the platen is located. The two pivots or axes 35 and 37 are likewise arranged one above the other in a vertical plane parallel to the plane in which the axes 31 and 39 are situated.

It has before been pointed out that each draw link 24 or 24ª is operatively connected at its rear end to a bell crank lever 18 or 18ª which in turn is pivoted at 19 to a hanger 20 or 20ª. Each of the hangers is provided with an enlarged bifurcated head 45 for the reception of the bell crank. Projecting from the head 45 of the hanger is a cylindrical stem 46 which is recessed or grooved circumferentially at 47. At the junction of the head and stem is a shoulder which coöperates with an abutment 48 on each of the clamping plates 21 or 21ª. The abutments on the clamping plates have a step-like arrangement, as indicated in Figs. 2 and 15, and the various hangers of each series are segmentally arranged. The construction is such that the two plates 21 constitute a support for the hangers 20 of the bell cranks 18 at the rear half of the circle, whereas two like clamping plates 21ª constitute supports for the hangers 20ª of the bell cranks 18ª which are at the front half of the circle.

Each series of hangers and bell cranks is segmentally arranged as indicated in Fig. 2, and the segments are oppositely disposed, and from an examination of Figs. 1, 4, 5 and 6, it will be seen that the forward sets of hangers and bell cranks are maintained on a higher plane than the rear sets of hangers and bell cranks, for purposes which will hereinafter appear. Each hanger stem 46 extends between the clamping plates 21 of the rear segment or the clamping plates 21ª of the front segment as the case may be, and is secured against withdrawal by binding screws 49 which pass freely through one of the pair of plates 21 or 21ª and are screw-threaded into the other companion plate of the pair. The bodies of the screws 49, in projecting from one plate to the other, extend into the circumferential groove 47 in the stem of the hanger and thus prevent withdrawal thereof. After the hangers have been adjusted to the proper positions, the screws 49 may be tightened, thus causing the clamping plates to be drawn one toward the other to securely clamp the hangers in their adjusted positions. To withdraw a hanger entirely from its support it is merely necessary to remove the screws 49 which coöperate with the particular hanger to be withdrawn when the latter may be readily detached. When, however, the screws are loosened, though not necessarily withdrawn, the binding force of the plates is removed from the stem and the hanger may be adjusted around the axis of its stem.

From an examination of Figs. 1 and 4, it will be seen that the finger-keys and the actuating levers 26 are arranged in banks in step-like order and that the draw-links 24 and 24ª are of different lengths so that the links 24 may extend from their actuating devices arranged at different points fore and aft of the machine to the rear set of bell cranks 18 and the links 24ª may extend from their actuating devices arranged at different points fore and aft of the machine to the forward set of bell cranks 18ª.

In practice, it is preferred to alternately connect the draw links 24 and 24ª with the levers 26 in each transverse row of levers so that adjacent keys will connect with type bars that are upon opposite sides of the circle of type bars or with type bars that are widely separated from each other. This is in order to avoid a conflict between the type bars when adjacent keys are depressed at or about the same time, whether accidentally or otherwise. It will be understood that when the type bars of adjacent keys are upon opposite sides of the circle or are widely separated there can be no conflict between the type bars excepting in the vicinity of the printing point. In the Yost style of machines the types when at rest against the inking pad lie close together and when adjacent types are operated, owing to their traveling in radial paths, such types are apt to clash or contact with each other at a short distance from the pad, and if the keys controlling such two types be depressed simultaneously there is a liability of the types catching together near the pad and interlocking, and this same result is also likely to happen if the keys be actuated in rapid succession so that the second operated type is started on its travel before the first operated type has returned past the clashing point in the vicinity of the pad. In the prior Yost machines many of the adjacent types were operated or controlled by adjacent keys and hence when two such keys were struck together the types would clash and stick or interlock, while if the said adjacent keys were struck rapidly in succession the adjacent types controlled thereby would sometimes also clash when the second operated type met the returning first operated type in the vicinity of the pad.

By the present mode of connecting the keys with the type bars the contiguous closely arranged and radially operated types are not controlled by adjacent keys at the keyboard but by keys which are more or less widely separated from each other, or in other words, no two adjacent keys, considered either transversely of the keyboard or longitudinally thereof or diagonally thereof are connected to contiguous types at the inking pad, and hence it will be seen that if two adjacent keys be struck simultaneously the types operated thereby will not be contiguous types but types that are more or less widely separated from each other, and hence it will be seen that there is no danger of collision and interlocking between said types at or in the vicinity of the inking pad. The same thing being true if the contiguous keys are struck quickly in succession it follows that by the present arrangement the objection heretofore found to the prior Yost machines of the colliding and interlocking of the type bars and the necessity for stopping work to disengage them is practically avoided, while at the same time contiguous keys may be operated with greater rapidity than in the said prior construction.

By referring to Fig. 2 it will be seen that the key for the numeral "5" connects with a draw-link 24 that extends to the rear of the circle whereas the adjacent key for the numeral "6" connects with a draw-link 24ª that coöperates with a type bar at the front of the circle and this arrangement, substantially, is maintained throughout. Then, again, by this system of connections the upper and lower case types on the type carriers 13 may alternate, regularly or otherwise, as they extend around the circle and thereby provide a more even distribution and flow of the ink in the pad 15 and a more even inking of the types than is the case where the upper case characters are grouped together and the lower case characters are separately grouped together. The lower case types being used much more frequently than the upper case types it follows that if the lower case types are arranged together in groups that portion of the pad against which the lower case types strike becomes more quickly exhausted of its ink than the portion against which the upper case types strike, and hence after the pad has been in use some time the lower case types will print faintly compared to the upper case types and the writing will appear ununiform, which is objectionable. But in the present construction wherein the upper case types and the lower case types are not arranged in groups but are interspersed at short intervals, the ink by the capillary attraction of the fibers of the pad and by the blows of the types is enabled to more readily flow and distribute itself entirely around the pad instead of being confined to and exhausted more quickly at the lower case types than at the upper case types as in the prior machines, and hence it will be seen that the ink impressions of the types in the present machine may be practically uniform throughout the page of writing. It will likewise be seen that the points of connection 25 between the various draw-links 24 and 24ª and their actuating levers 26 are maintained in step-like arrangement, which conforms to the step-shape arrangement of the levers themselves and the key-stems with which they are connected. By reason of this fact and the further fact that the bell-crank levers 18 and 18ª, to which the draw-links 24 and 24ª respectively are connected, are maintained at different heights or at different distances from the type carriers, it is possible to provide in a machine of the usual dimensions eighty-five substantially horizontally-disposed draw-links, for the eighty-five type carriers employed in the machine, without any interference in the operations of the draw-links and without unduly crowding any of the parts.

It will be observed, especially from Fig. 4, that certain of the links 24 and 24ª are crossed or cross one another and extend from the front of the machine rearwardly in order to properly connect with their associated bell cranks, which are arranged in two banks or tiers, one at the front and the other at the rear of the type bar system.

The two series of bell cranks 18 and 18ª being maintained at different elevations, it follows that the draw-links 17ª for the type bars at the front half of the circle of type bars are necessarily shorter than the links 17 employed for the type bars at the rear half of the circle, where the bell cranks 18 are maintained on a lower level than the bell cranks 18ª for the front half of the circle of type bars.

It has before been explained that the hangers 20 and 20ª are rotatable or adjustable around the axes of their stems and for this reason each hanger may be adjusted or turned relatively to the others so as to bring the plane of its bell crank into alinement with its draw-links 24 and 17, or 24ª and 17ª as the case may be, in order that the links and the bell crank of each action may move in a single plane. This is illustrated diagrammatically in Fig. 6, which shows in front elevation at the lower portion of the figure and in perspective at the upper portion of the figure, parts of a number of actions, these same parts being diagrammatically shown in Fig. 5 and shown in front elevation in Fig. 7.

From Fig. 6, it will be observed that the draw links 17, 17ª and 24, 24ª and the bell cranks 18 and 18ª at the center of the machine move in substantially parallel vertical planes while the draw-links and bell cranks of each action at the side of the machine move in a plane at an angle to those at the center of the machine, and the planes of these parts of the actions upon opposite sides of the machine are converging.

The draw links 17 or 17ª, and 24 or 24ª, and the coöperating bell crank 18 or 18ª of each action moving as they do in practically the same place, whether the parts coöperate with a finger key at the center of the keyboard or at either side thereof, prevents lateral or torsional strain and consequent binding of the parts of the action between the finger key and type bar, and thus there is provided a simple and efficient action substantially uniform throughout the system and capable of easy operation. The links 17, 17ª and 24 and 24ª being draw or pull links, it is obvious that they may be much lighter than would be the case if they were push or thrust links.

In practice, no two adjacent draw links 24 or 24ª are maintained in parallelism and this arrangement is rendered possible by the arrangement of the actuating levers 26 and the bell cranks 18 and 18ª with which these links are connected. The actuating levers 26 are maintained in transverse rows extending from side to side of the keyboard, the levers of each row being pivoted on a single rod 31; and the said actuating levers are likewise maintained in longitudinal rows that extend from the front toward the rear of the machine. These longitudinal rows of levers are, however, maintained in step-shape arrangement owing to the step-like arrangement of the transverse pivot rods 31.

A longitudinal row of keys comprises those keys which extend in a straight line from the front toward the rear of the machine, and for each such longitudinal row of keys there is a longitudinal row of actuating levers which are arranged thereunder and operatively connected to the keys. For each such row of keys and underlying actuating levers there is a group of actuating links, wires or rods, and the outer or forward ends of the latter are pivotally connected to a longitudinal row of levers at different points on the levers, considered widthwise of the row, and the rods or wires of each group are so connected at their front ends to the longitudinal rows of levers and at their rear ends to the two banks of bell cranks that are operatively connected to the type carriers that the successive or adjacent wires or rods are arranged out of parallelism, as will be seen from the side diagrammatic view, Fig. 4. It will also be seen that the actuating links or levers 26 are each mounted at one end on a fixed pivot and that the links or levers extend therefrom downwardly and rearwardly; also that the forward or outer end of each substantially horizontal rod or wire is jointed or connected to the free end of said actuating link or lever, while the rear end of said rod or wire is operatively connected to the type carrier; also that there is an arm or device which extends from the actuating link or lever at or in the vicinity of the jointed connection between said rod and said link or lever up to a point where the vertically moving key stem is arranged, and that said key stem is jointed to or pivotally connected to the said arm or device which transmits the downward motion of the key to the actuating link or lever and rod or wire. It will also be seen that when the vertically movable key is depressed the force is applied directly to the swinging link or lever in the vicinity of the pivotal connection thereto of the wire and in rear of the fixed pivot of said actuating link or lever, and so that when said finger key is depressed the link or lever will be swung downwardly and toward the front of the machine, and in such movement will draw the rod or wire toward the front, and through the operative connections described will cause the type bar to be actuated.

Referring to Fig. 2, it will be seen that the front to rear row of keys which actuate the type bars having the types 6, Y, H, N, y, h, n, are connected to bell cranks at both front and rear of the system (formed by the two oppositely disposed segmentally arranged bell cranks 18 and 18ᵃ and their corresponding hangers); the finger keys bearing the letters n, y and H being connected to bell cranks and to type bars at the rear and the keys for the characters N 6 Y h being connected to corresponding type bars N 6 Y h at the front of the system.

Above the circular supports 12—13 for the type bars is arranged a circular universal bar 50 with which the guide link 9 of each of the type-actions is adapted to contact in the movement of the type to the printing position. This contact of the guide link with the universal bar 50 is sufficient to raise the latter at one side. Depending centrally from the universal bar is a rod 51 (see Figs. 1 and 16) which is provided with a head 52 and said rod passes loosely through a central aperture 53 in the universal bar or the spider 54 forming a part thereof. This rod also passes through an aperture in a central hub 55ᵃ, forming part of the framework of the machine. This hub is provided with a threaded tubular neck 55ᵇ over which the supports 12 and 13 are slipped and then clamped on the shoulder of the hub by a nut 55ᶜ, the supports 12 and 13 being formed with central apertures for the purpose of enabling them to be seated on said shoulder. Said rod 51 is threaded at its lower end and engages with the interiorly threaded portion of a neck formed at the upper end of a block 56, to which is pivoted at 57 the forward end of a dog rocker 58 (Fig. 1), that is pivotally supported upon a fixed bar 59, which extends from side to side of the frame and is secured at its ends thereto.

The rocker is provided with a fixed or rigid dog 60 and a loose dog 61, the loose dog 61 being pivoted at 62 and having a lateral extension that carries a depending pin 64. This depending pin 64 is connected to one end of a coiled spring 65, the opposite end of which is secured to a pin 66 carried by the dog rocker. The spring 65 tends normally to maintain the loose dog 61 in its advanced position or out of alinement with the fixed dog and the movement of the dog 61 by the spring is limited by a suitable fixed pin.

The lower end of the block 56 is threaded interiorly (Fig. 16) to receive the upper threaded end of a rod or pin 51ᵃ, which is provided at its lowermost end with a head or shoe 68 that coöperates with a rounded shoe 69 (Fig. 1) carried by a bell crank lever 70 that is pivoted at 71 to an arm 72 which projects forwardly from a fixed rod 73 that extends across the machine and is supported by the sides of the frame 1 thereof.

Connected to the vertical arm of the bell crank 70 is a draw link 74 which has its opposite end pivotally connected at 75 to a lever 76 that is pivotally supported upon one of the rods 31 and has a forwardly projecting arm 78 which is pivotally united at 79 to a depending stem 80 of the space bar 81. The stem 80 of the space bar may be notched as shown at 82 for the reception of a longitudinally extending bar 83 which is connected to links or guide arms 84 that are pivoted upon one of the rods 39 which extend from side to side of the machine. It will be observed that the space bar or key is supported and guided in its movements in a similar manner to the character keys and so that the space bar or the stem thereof has a substantially true vertical movement when operated. The motion transmitted to the parts by a depression of the space bar or key 81 is effective to raise the rod 51 without, however, transmitting movement to the universal bar by reason of the fact that the rod 51 projects loosely through the central opening 53 in the spider of the universal bar. A depression of the space key will through the lever 76, connecting rod 74, bell crank 70 and block 56, cause the dog carrier 58 to vibrate on its pivot 59 and move the loose dog 61 down out of engagement with a tooth of the feed or escapement wheel 86 and bring the fixed dog 60 into engagement with said wheel, and when the space key is released the loose dog will again be brought into engagement with the next tooth of the feed wheel and the carriage will be advanced one letter space distance, as will hereinafter more fully appear.

When the block 56 is actuated by the space key to effect the rocker as just described, the free end of the rod 51 moves upwardly through the aperture in the universal bar or in the spider or armed portion thereof and the universal bar remains at rest in its normal horizontal position. When, however, a character key is depressed the universal bar will be acted upon on one side by the link 9 of the particular type bar actuated, and by the engagement of the spider with the head 52 of the rod (the diametrically opposite portion of the spider bearing on the plate 12 as a fulcrum) lifts the rod and the block and the dog rocker will be vibrated to throw the loose or spacing dog out of engagement with the escapement wheel and the rigid dog into engagement therewith. When the depressed key is relieved of pressure the parts are all restored to their normal positions by their several springs.

The feed wheel 86 is rigidly connected by a screw 87 to a hollow shaft 88 that is vertically disposed and extends through the base to the upper portion of the machine. This sleeve or hollow shaft 88 is operatively connected by suitable clutch mechanism contained within the housing 105, to a hollow shaft 102 that surrounds the hollow shaft 88 for a portion of its length and both of the hollow shafts project through and above the top plate or type ring 2 of the machine. The hollow shaft 102 carries at its upper end a pinion 106 and just below the pinion 106 is secured a second pinion 107. Upon reference to Fig. 1 of the drawings, it will be seen that the pinion 106 meshes with a feed rack 108 that is carried by the carriage 109, whereas the pinion 107 meshes with a gear 110 that is connected to a pinion 111 which in turn meshes with a rack 112 that is carried by ball separator 113. This separator may be of any suitable construction and is adapted to maintain the loose anti-friction balls 114 in a fixed relation one to another in the fixed raceways 115 during the travel of the carriage from end to end of the machine. It will be understood that a rotation of the hollow shaft 102 will cause a rotation of the feed pinion 106 and the pinion 107 so that the ball separator and carriage will be moved when the escapement mechanism is operated to effect a rotation of the hollow shaft. It should be understood that a suitable spring drum (not shown) is connected to the carriage to move it in the direction of its feed, or from right to left, when the escapement mechanism is operated, as in prior machines.

The various features shown in the accompanying drawings that relate to the carriage, to the escapement and to the line lock mechanisms constitute no part of my invention, but are the invention of Charles W. Walker, and are described and claimed in an application filed by him on the 21st day of December 1901, and bearing Serial No. 86,821.

While I have shown and described with considerable detail one form or embodiment of my invention it should be understood that various changes may be made without departing from the spirit of my invention.

What I claim as new and desire to secure by Letters Patent, is:—

1. In a typewriting machine, the combination of type carriers, finger keys therefor arranged in banks at different heights, intermediate links between said type carriers and finger keys and operatively connected to said keys, said links being arranged at their forward ends in banks which conform substantially to the arrangement of the banks of finger keys and arranged at their rear ends in two banks one of which is higher than the other, and connections from both of said rear banks to the type carriers.

2. In a typewriting machine, the combination of circularly arranged type carriers, finger keys therefor, substantially horizontal intermediate actuating links between said type carriers and finger keys and operatively connected to said keys, said links being arranged at their rear ends in two banks, one of which is higher than the other, and connections from both banks to the type carriers.

3. In a typewriting machine, the combination of type carriers, finger keys therefor arranged in banks, intermediate substantially horizontal links between the type carriers and finger keys, and pivoted levers arranged in banks and operatively connected to the finger keys and links, the pivotal centers of the levers of different banks being at different heights and the points of connection between the levers and links being also at different heights.

4. In a typewriting machine, the combination of type carriers, finger keys therefor, actuating links operatively connected to the type carriers, actuating levers that are arranged in banks and which are operatively connected to the finger keys and to said links and each of which is provided with an elongated pivotal bearing, and a single pivotal rod upon which the levers of each bank are supported.

5. In a typewriting machine, the combination of type carriers, finger keys therefor, actuating links operatively connected to the type carriers, and actuating levers which are operatively connected to the finger keys and to the links and each of which levers is considerably wider than its coöperating link at the point of connection between the two so that said last mentioned links may be connected to the actuating levers at different points in the width thereof and transversely of the machine.

6. In a typewriting machine, the combination of type carriers, finger keys, plate-like actuating levers which are pivoted on elongated bearings extending transversely of the machine and which are operatively connected to the finger keys, and links operatively connecting said levers with coöperating type carriers, and the said links being connected to the said plate-like levers at varying points in their widths.

7. In a typewriting machine, the combination of type bars, finger keys, actuating instrumentalities between each finger key and its type bar, and two series of positely disposed segmentally arranged hangers for said actuating instrumentalities, one series of said hangers being nearer to the type bars than the other.

8. In a typewriting machine, the combination of type bars, finger keys, actuating instrumentalities between the finger keys and type bars, which actuating instrumentalities include substantially horizontally disposed links, adjacent links being of different lengths, two series of oppositely disposed segmentally arranged hangers for said actuating instrumentalities, one series of said hangers being nearer to the type bars than the other, and two series of substantially vertical links connected to said type bars.

9. In a typewriting machine, the combination of circularly arranged type carriers, two segmentally arranged series of substantially vertically disposed actuating links, the links in one series being shorter than the links in the other series, and means for operatively connecting each link to a finger key.

10. In a typewriting machine, the combination of circularly arranged type carriers, two segmentally arranged series of substantially vertically disposed actuating links, the links in one series being shorter than the links in the other series, and actuating draw links which are disposed at substantially right angles to the vertical links and operatively connected with finger keys.

11. In a typewriting machine, the combination of circularly arranged type carriers, two segmentally arranged series of vertically disposed actuating links which are connected to said carriers, the links in one series being shorter than the links in the other series, substantially horizontally disposed actuating links which are operatively connected to the vertical links, and finger keys operatively connected to the substantially horizontally disposed links.

12. In a typewriting machine, the combination of type carriers, finger keys, plate-like actuating levers pivoted and having their planes extending transversely of the machine and operatively connected to the finger keys, and actuating links connected to said levers at different points in their widths and operatively connected to the type carriers.

13. In a typewriting machine, the combination of type carriers, finger keys, plate-like actuating levers arranged in rows, the different transverse rows of which are pivoted at different heights and have their planes extending transversely of the machine, operative connections between the levers and the finger keys, and actuating links which have less width than the actuating levers and which are connected to said levers at different points in their widths.

14. In a typewriting machine, the combination of type carriers, finger keys, plate-like actuating levers having their pivots and planes extending transversely of the machine and being operatively connected to the finger keys, and actuating links operatively connected to the type carriers and connected to said plate-like levers at different points in their widths.

15. In a typewriting machine, the combination of type carriers, key stems which have a step-shape arrangement, coöperating actuating levers which likewise have a step-shape arrangement and actuating links connected to the actuating levers so that the ends of said links which are connected to the actuating levers have a step-shape arrangement.

16. In a typewriting machine, the combination of type carriers, key stems which have a step-shape arrangement, coöperating actuating levers that are each connected to a key stem and which levers have a step-shape arrangement that corresponds substantially to the arrangement of the key stems, actuating links, each of which is pivoted to an actuating lever so that the ends of said links which are connected to the actuating levers have a step-shape arrangement that corresponds substantially to that of the actuating levers and key stems, and means for operatively connecting the opposite end of each link to a type carrier, which connecting means are arranged in oppositely disposed segments that are in different planes.

17. In a typewriting machine, the combination of type carriers, key stems which have a step-shape arrangement, coöperating actuating levers which are arranged in transverse rows and which likewise have a step-shape arrangement, and substantially horizontal actuating links connected to the levers in such a manner that successive links from side to side of the machine connect with levers in different transverse rows.

18. In a typewriting machine, the combination of type carriers, key stems which have a step-shape arrangement and which are arranged in longitudinal rows, coöperating actuating levers which have a step-shape arrangement and which are likewise arranged in longitudinal rows beneath the rows of key stems, and actuating links arranged in groups, one group for each longitudinal row of levers, and each group being connected to its longitudinal row of levers at different points widthwise thereof.

19. In a typewriting machine, the combination of a series of type carriers, a series of substantially vertical links connected thereto, a series of bell crank levers connected to said substantially vertical links, a series of substantially horizontal links connected to said bell crank levers, a series of actuating levers arranged in transverse rows and connected to said substantially horizontal links, the points of connection between said substantially horizontal links and the actuating levers being at different heights in the several transverse rows and a series of key stems connected to said actuating levers.

20. In a typewriting machine, the combination of a series of type carriers, a series of substantially vertically disposed links connected to said type-carriers, a series of substantially horizontally disposed links, and a series of intermediate bell crank levers connecting said two series of links, the said bell crank levers being adjustable to different angular positions so that the said links and bell crank of each type action shall all work in substantially the same plane.

21. In a typewriting machine, the combination of a type carrier, a link connected thereto and extending downwardly therefrom, a substantially horizontal key actuated link, a bell crank intermediate of and connecting said links, and means for adjusting the pivot or fulcrum of said bell crank to an inclined position so as to cause the bell crank to work in substantially the same plane as the said links.

22. In a typewriting machine, the combination of a series of type carriers arranged in a circle, a keyboard of greater width than the diameter of the circle of type carriers, bell cranks arranged in two substantially segmental series and practically co-extensive in width with the width of the keyboard, connecting links extending from the type carriers to the said bell cranks, those links on the sides extending downwardly and outwardly, and a substantially horizontal series of links connecting said bell cranks with the keyboard.

23. In a typewriting machine, the combination of a series of type carriers arranged in a circle, a keyboard of greater width than the circle of type carriers, bell cranks arranged in two segmental series and of a width practically equal to that of the keyboard, a series of downwardly extending links connecting said type carriers with said bell cranks, and a series of substantially horizontal links connecting said bell cranks with the keyboard, the arrangement of the bell cranks being such that those bell cranks which are on the sides of the machine or outside the circle of type carriers are arranged obliquely and so that each bell crank lies substantially in the plane of their connected downwardly extending and horizontal links.

24. The combination of a series of type carriers arranged in a circle, a keyboard of greater width than the circle of type carriers, a series of bell cranks having a width substantially equal to that of the keyboard and extending at their sides beyond the circle of type carriers, a series of links extending down from the series of type carriers to the series of bell cranks, a series of substantially horizontal links extending from the bell cranks to the keyboard, and means for enabling the adjustment to oblique positions of those bell cranks which coöperate with the downwardly extending and substantially horizontal links that extend beyond the sides of the circle of type carriers and so that the links and bell crank of each action will work in substantially the same plane.

25. In a typewriting machine, the combination of a series of type carriers, a series of downwardly extending links connected thereto, a series of bell crank levers to which said links are connected, a series of hangers to which said bell crank levers are pivoted, means for affording a rotatable adjustment of some of said hangers and a series of key actuated substantially horizontally disposed links connected to said bell crank levers, the construction and arrangement being such that the links and bell crank connected to each adjustable hanger may move in a single plane.

26. In a typewriting machine, a hanger having a horizontally disposed cylindrical stem with a bifurcated head and a bell crank lever pivoted therein, clamping plates between which said stem may be turned on its axis without removing it from between said plates, and screws which pass through said plates adjacent to the hangers for adjusting the plates, to secure the hanger in its adjusted position or to render it free to turn and which coöperates with the hanger to prevent its withdrawal from between the plates.

27. In a typewriting machine, a hanger having a cylindrical stem, a bell crank lever pivoted to said hanger, and clamping plates for the stem.

28. In a typewriting machine, a hanger having a cylindrical stem provided with a circumferential groove, a bell crank pivoted to said hanger, and a device that extends into the groove in said stem and permits the latter and the bell crank to be turned but prevents a withdrawal thereof.

29. In a typewriting machine, the combination of two clamping plates each having a series of step-shaped corresponding shoulders thereon, shouldered hangers contained between the clamping plates, the shoulders upon said hanger coöperating with the shoulders on the clamping plates, and means for securing the hangers in place between said plates.

30. In a typewriting machine, the combination of two sets of oppositely disposed clamping plates, which sets are maintained in different planes, and hangers segmentally arranged and secured in place between the plates of each set.

31. In a typewriting machine, the combination of a type carrier, a key stem, intermediate connections between said type carrier and key stem, and including an actuating lever having an arm that is pivoted to the key stem, and a second arm which is pivoted to a fixed portion of the machine and to the stem, whereby said stem is wholly supported and guided in its movement by said arms.

32. In a typewriting machine, the combination of type carriers, finger keys pivoted at different points fore and aft of the machine and intermediate draw links which extend fore and aft of the machine and have a general horizontal disposition and are operatively connected to said type bars and finger keys, the points of connection of said links for different type bars being at different heights.

33. In a typewriting machine, the combination of type carriers, finger keys therefor, and intermediate actuating draw links of different lengths interposed between said type carriers and finger keys and operatively connected thereto, and moving substantially in parallel vertical planes that extend fore and aft of the machine, some of said links being inclined upwardly from front to rear of the machine.

34. In a typewriting machine, the combination of type carriers, finger keys therefor, and intermediate actuating draw links 24 and 24ᵃ situated substantially in vertical and parallel planes that extend fore and aft of the machine and interposed between the said type carriers and finger keys and operatively connected thereto, the points of connection of said links being lower at the front ends than at the rear ends where they are arranged in two oppositely disposed curves 35. In a typewriting machine, the combination of upwardly striking circularly arranged type carriers, finger keys therefor intermediate actuating links 24 and 24ᵃ that extend fore and aft of the machine and between said type carriers and finger keys and operatively connected thereto, said link being arranged at their rear ends in tw horizontal planes, one of which is highe than the other.

36. In a typewriting machine, the comb nation of type carriers, finger keys therefc arranged in banks, intermediate links b tween the type carriers and finger keys, an pivoted levers operatively connected to tl finger keys and links, the pivotal centers the levers for the keys of different banl being at different heights and arranged different transverse planes fore and aft the machine.

37. In a typewriting machine, the coml nation of type carriers, finger keys arrang in transverse rows, and intermediate act ating links between the keys and carrie and which are operatively connected there the adjacent links for each transverse row keys being of different lengths and exter ing to type carriers which are non-adjac and widely separated.

38. In a typewriting machine, the com nation of type carriers, actuating lev which are pivoted transversely of the r chine, and means for operatively conn ing each of said levers with a coöperat type carrier, each lever being considera wider at its point of connection than said connecting means.

39. In a typewriting machine, the con nation of type carriers, finger keys, pl like actuating levers which are pivoted elongated bearings extending transver of the machine and abutting one aga another, and which are operatively nected to the finger keys, and means operatively connecting each of said le with a coöperating type carrier, each l being considerably wider at its point of nection than the said connecting means.

40. In a typewriting machine, the co nation of type bars, finger keys, actua instrumentalities between each finger and its type bar and including links 24 and 24ª, and two series of oppositely disposed segmentally arranged hangers for said actuating instrumentalities, one series of said hangers being nearer to the type carriers than the other, whereby the rear ends of the links are separated into sets, one set being above the other.

41. In a typewriting machine, a hanger having a cylindrical stem formed with a bifurcated head for the reception of a bell crank, clamping plates between which said stem is secured, and means for adjusting the plates toward each other.

42. In a typewriting machine, a hanger having a horizontally disposed cylindrical stem with a bifurcated head for the reception of a movable part, clamping plates between which said stem may be turned on its axis without removing it from between said plates, and means for adjusting the plates to secure the hanger in its adjusted position or to render it free to turn.

43. In a typewriting machine, a hanger having a cylindrical stem with a circumferential groove therein, means for securing a movable part to said hanger, clamping plates between which said hanger is secured, clamping screws which project from one plate to another and into the groove in the hanger stem, whereby the hanger can be turned or adjusted without removing the screws and can be secured against movement on tightening up the clamping plates by the screws.

44. In a typewriting machine, a hanger having a cylindrical stem, a shouldered head upon said stem, means for securing a movable part to said hanger head, clamping plates between which said hanger is secured, shoulders upon the clamping plates which coöperate with the shoulder upon the hanger head and means for adjusting the clamping plates one with relation to another to secure the hanger in its adjusted position.

45. In a typewriting machine, a hanger having a cylindrical stem with a circumferential groove therein, a shouldered head upon said stem, means for securing a movable part to said hanger head, clamping plates between which said hanger is secured, shoulders upon the clamping plates which coöperate with the shoulder upon the hanger head, clamping screws which project from one plate to another and into the groove in the hanger stem, whereby the hanger can be turned or adjusted without removing the screws and can be secured against movement on tightening up the clamping plates by the screws.

46. In a typewriting machine, a hanger construction comprising two clamping plates, a series of segmentally arranged step-shaped corresponding shoulders on said clamping plates, shouldered hangers contained between the clamping plates, the shoulders upon said hangers coöperating with the shoulders on the clamping plates and screws for securing the plates together and the hangers in place between said plates.

47. In a typewriting machine, a hanger construction comprising two sets of oppositely disposed clamping plates and hangers segmentally arranged and secured in place between the plates of each set and adapted to be turned on their longitudinal axes between said plates.

48. In a typewriting machine, the combination of type carriers, key stems, intermediate connections between said type carriers and key stems, and movable arms which wholly support and guide the stems in their movement.

49. In a typewriting machine, the combination of a type carrier, a vertically movable key stem, intermediate connections between said type carrier and key stem, and movable arms which wholly support and guide the stem in its movement, one of said arms constituting a portion of the intermediate connections between the key stem and carrier.

50. In a typewriting machine, the combination of type carriers, vertically movable key stems, intermediate connections between said type carriers and key stems and movable arms which are pivoted to said key stems and to fixed portions of the machine and which wholly support and guide the stems in their movement.

51. In a typewriting machine, the combination of type carriers, vertically movable key stems which are arranged in banks, swinging actuating levers which are pivoted to move in vertical planes which extend fore and aft of the machine and which are arranged in different banks and in different rows fore and aft of the machine, each of said levers being connected to a coöperating key stem, and intermediate connections between said levers and type carriers.

52. In a typewriting machine, the combination of type carriers, vertically movable key stems which are arranged in banks, swinging actuating levers of a uniform size which are arranged in banks that correspond substantially to the bank arrangement of the key stems and are pivoted at different heights fore and aft of the machine, each of said levers being connected to a coöperating key stem, and intermediate connections between said levers and type carriers.

53. In a typewriting machine, the combination of type carriers, key stems which have a step-shape arrangement, coöperating actuating levers which likewise have a step-shape arrangement, actuating links each connected at one end to an actuating lever so that the ends of said links which are connected to the actuating levers have a step-shape arrangement, and means for operatively connecting the opposite end of each link to a type carrier, which connections are in substantially segmental arrangement.

54. In a typewriting machine, the combination of type carriers, key stems which have a step-shape arrangement, coöperating actuating levers which likewise have a step-shape arrangement, actuating links of different lengths connected to the actuating levers so that the ends of said links which are connected to the actuating levers have a step-shape arrangement and means for operatively connecting the opposite end of each link to a type carrier, which connections are arranged in oppositely disposed segments.

55. In a typewriting machine, the combination of type carriers, key stems which have a step-shape arrangement, coöperating actuating levers which likewise have a step-shape arrangement, actuating links of different lengths and terminating at their rear ends in two banks and connected to the actuating levers at their forward ends so that the ends of said links which are connected to the actuating levers have a step-shape arrangement and means for operatively connecting the rear ends of said links to type carriers, which connections are arranged in oppositely disposed segments that are in different planes.

56. In a typewriting machine, the combination of type carriers, key stems which have a step-shape arrangement, coöperating actuating levers that are each pivoted to a key stem and which have a step-shape arrangement that corresponds substantially to the arrangement of the key stems, and actuating links, each of which is pivoted to an actuating lever so that the ends of said links which are connected to the actuating levers have a step-shape arrangement that corresponds substantially to that of the actuating levers and key stems.

57. In a typewriting machine and in type actions, the combination of a series of type carriers, a row of keys extending longitudinally of the keyboard, a longitudinal row of actuating levers thereunder, said levers being arranged to swing fore and aft of the machine, and a set of actuating rods operatively connected to the type carriers and connected to said row of actuating levers at different points considered widthwise of said longitudinal row and transversely of the machine.

58. In a typewriting machine and in type actions, the combination of a series of type carriers, a row of keys extending longitudinally of the keyboard, a longitudinal row of actuating levers thereunder arranged to swing fore and aft of the machine and having a step-shape arrangement at their lower ends, and a series of connecting rods attached to said levers at different points considered widthwise of the row and transversely of the machine, said connecting rod being operatively connected to said type carriers.

59. In a typewriting machine and in type actions, the combination of a series of type carriers, a row of keys extending longitudinally of the keyboard, a longitudinal row of plate-like actuating levers thereunder, and of substantially uniform width and terminating at their lower ends in different horizontal planes, and a series of connecting wires attached to said plate-like actuating levers at different points in their widths and also operatively connected to said type carriers.

60. In a typewriting machine, the combination of type carriers, key stems which have a step-shape arrangement, coöperating actuating levers which likewise have a step-shape arrangement and actuating links connected to the levers in such a manner that the successive links of a group connect with actuating levers in the same longitudinal row.

61. In a typewriting machine, the combination of circularly arranged type carriers, key stems which have a step-shape arrangement and actuating links operatively connected to said key stems, the adjacent actuating links being of different lengths and extending alternately to opposite sides of the circle of type carriers.

62. In a typewriting machine, the combination of type carriers, key stems which have a step-shape arrangement, and actuating links operatively connected to said key stems and situated substantially in vertical parallel planes that extend fore and aft of the machine, the adjacent actuating links widthwise of the machine being out of parallelism.

63. In a typewriting machine, the combination of type carriers, key stems which have a step-shape arrangement, coöperating actuating levers which likewise have a step-shape arrangement, and actuating links connected to the levers in such a manner that successive links from side to side of the machine connect with levers in different transverse rows, the said links being arranged in groups, one group for each longitudinal row of levers, and the successive links of a group connecting with actuating levers in the same longitudinal row.

64. In a typewriting machine, the combination of type carriers, key stems which have a step-shape arrangement, coöperating actuating levers which likewise have a step-shape arrangement, and actuating draw links, each connected at one end to one of said levers in such a manner that successive links from side to side of the machine connect with levers in different transverse rows, the opposite ends of said links being segmentally arranged and operatively connected to the type carriers.

65. In a typewriting machine, the combination of type carriers, key stems which have a step-shape arrangement, coöperating actuating levers which likewise have a step-shape arrangement and actuating links which are crossed and are connected to the levers in such a manner that successive links from side to side of the machine connect with levers in different transverse rows.

66. In a typewriting machine, the combination of key stems, actuating levers connected to said key stems, draw links each connected at one end to an actuating lever, and at its opposite end to a two-arm lever, drivers for the type carriers, each of said drivers being pivoted intermediate of its ends to a fixed portion of the machine and vertically disposed links each of which is pivoted to a two-arm lever and to a driver.

67. In a typewriting machine, the combination of key stems, actuating levers connected to said key stems, draw links each connected at one end to an actuating lever and at its opposite end to a two arm lever, drivers for the type carriers, vertically disposed draw links each of which is connected at one end to a two arm lever and at its opposite end to a driver.

68. In a typewriting machine, the combination of a type carrier, an actuating lever operatively connected to said type carrier, the said actuating lever comprising an endless band with bearings formed therein, a finger key, and operative connections between the finger key and actuating lever.

69. In a typewriting machine, the combination of a type carrier, an actuating lever operatively connected to said type carrier, the said actuating lever comprising an endless band formed with circular pivotal bearings at its ends and an intermediate neck or shank, a finger key and operative connections between the finger key and actuating lever.

70. In a typewriting machine, the combination of a type carrier, an actuating lever, a link operatively connected to said type carrier and lever, the said actuating lever comprising an endless band with tubular pivotal bearings formed in the ends thereof and one of said bearings being slitted for the reception of said link, a finger key and operative connections between the finger key and actuating lever.

71. In a typewriting machine, the combination of a type carrier, a key therefor, an actuating lever comprising a tube flattened throughout a portion of its extent and provided with tubular pivot bearings at each end thereof and an arm projecting from said lever and to which the key is connected and operative connections between said type carrier and the actuating lever.

72. In a typewriting machine and in a type action, the combination of a type carrier, a swinging element having a fixed pivot at one end, a substantially horizontal draw link or connecting rod attached at its forward end to the free end of said element and operatively connected at its rear end to the type carrier, and a key stem positively connected to said element at a point between the fixed pivot of the element and the rear end of the rod, whereby when the key is depressed it operates to swing the said element and draw the connecting rod forwardly and thus operate the type carrier.

73. In a typewriting machine and in a type action, the combination of a type carrier, a swinging element having a fixed pivot and extending therefrom rearwardly, a connecting rod having a general horizontal disposition and extending fore and aft of the machine and connected to the free end of said element and also operatively connected to the type carrier, and a key stem operatively connected to said element and rod, so that the force is applied directly to the element in rear of the pivot of the element to draw the connecting rod toward the front of the machine.

74. In a writing machine, a system of type actions, each type action comprising a jointed actuating connection having its rear substantially horizontally disposed end portion operatively connected to the part to be actuated and the opposite forward end portion connected to a fixed point, and a key actuated device pivoted to the connection intermediate its ends to swing the part in front of the joint about said fixed point as a center of motion and to draw forwardly the part in rear of the joint and thereby move the part to be actuated.

75. In a writing machine, a system of type actions, each action comprising a jointed actuating connection having its front end operatively connected to a fixed point and its opposite substantially horizontally disposed end portion connected to the part to be actuated and movable toward and from said fixed point, and toward and from the front of the machine, and a stem key positively connected to said jointed connection for operating it.

76. In a typewriting machine, a system of type actions, each action comprising a type carrier, a jointed actuating connection extending to the keyboard of the machine and having one end operatively connected to the type carrier and the opposite end connected to a fixed point, and a stem key positively connected to and applied between the ends of said jointed actuating connection, the said connection being so disposed that when actuated the substantially horizontally disposed end operatively connected with the type carrier is caused to move toward the front of the machine.

77. In a typewriting machine, a system of type actions, each action comprising a part to be actuated, a jointed actuating connection comprising elements hinged together, the rearmost end of the forward element being connected to the forward end of the rear element and the jointed connection extending between said part to be actuated and a fixed point adjacent to the keyboard of the machine and adapted when actuated to operate said part with a pull, the rear element being substantially horizontally disposed and receiving a pull in the general direction of its length and toward the front of the machine when the action is operated, a finger piece, and a positive connection between the finger piece and said jointed actuating-connection that constantly connects the finger piece to the jointed actuating connection.

78. In a writing machine, a system of type actions, each action comprising a jointed actuating connection extending forwardly from a movable part to be actuated to a fixed pivot to which the jointed connection is connected, the rear end portion of said jointed connection being in a substantially horizontal plane and moving fore and aft of the machine, a member having one end positively and constantly connected to said jointed connection intermediate its ends, and an actuating device to which the other end of the member is connected.

79. In a writing machine, a system of type actions, each action comprising a jointed actuating-connection extending fore and aft of the machine from a movable part to be actuated to a fixed point and comprising links united at their adjacent ends by a hinge joint, and the rear link extending rearwardly from said joint in substantially a horizontal plane, an arm whose lower end is positively connected to the jointed connection intermediate its ends, and an actuating device to which the upper end of the arm is connected.

80. In a typewriting machine, a system of type actions, each action comprising a pivoted swinging type carrier, a jointed actuating connection operatively connected at its rear end to the type carrier and adapted to swing it on its pivot and connected at the forward end to a fixed point, a finger piece, and a part actuated thereby jointed to said finger piece and positively connected to said jointed actuating connection intermediate its ends.

81. In a writing machine, a system of type actions, each action comprising a type carrier, a jointed actuating connection operatively connected at its rear substantially horizontally disposed end portion to the type carrier and at its front end to a fixed point, and consisting of links united at their adjacent ends by a hinge joint, a vertically moving stem key, and a positive connection between said stem key and said jointed actuating connection.

82. In a writing machine and in type actions, the combination of pivoted type carriers, jointed actuating connections that extend fore and aft of the machine and all of which are operatively connected at their rear substantially horizontally disposed ends to the type carriers and adapted to swing the carriers on their pivots and all connected at their front ends to fixed pivots adjacent to the keyboard of the machine, finger pieces, and connections between the finger pieces and jointed actuating connections and applied to the latter intermediate of their ends by positive and constant connection and adapted to draw the rear members of all of said connections toward the front of the machine.

83. In a writing machine and in type actions, the combination of type carriers, jointed actuating connections mounted in parallel planes and each connected at one end to a type carrier and at the other end to a fixed point adjacent to the keyboard, finger pieces, and devices each having positive and constant connection with a jointed actuating connection intermediate its ends and adapted upon the depression of a finger piece to operate said jointed actuating connection to draw the rear substantially horizontally disposed member thereof toward the front of the machine.

84. In a writing machine and in type actions, the combination of pivoted type bars, jointed connections each comprising links united by a hinge joint and connected at one end to a type bar and at the other end to a fixed point adjacent to the keyboard of the machine, said connections extending fore and aft of the machine in parallel vertical planes, finger pieces and devices each having connection with a jointed connection intermediate its ends and adapted upon the depression of the finger piece to operate said jointed connection to move the rear substantially horizontally disposed element of the connection toward the front of the machine and to swing the type bar to the printing point by a pull on the parts.

85. In a writing machine and in type actions, the combination of pivoted type bars, jointed connections each comprising links united by a horizontal joint and extending fore and aft of the machine, said connections being in parallel vertical planes and the rear member of each jointed connection being a substantially horizontally disposed draw link that extends to the keyboard of the machine and each jointed connection being connected at one end to the type bar and at the other end to a fixed point adjacent to the keyboard of the machine, finger pieces, and devices, each having positive connection with a jointed connection intermediate its ends and actuated upon the depression of a finger piece to operate the jointed connection.

86. In a typewriting machine, the combination of type carriers, two sets of actuating devices therefor, finger keys, and a system of actuating links interposed between the said two sets of actuating devices and operatively connected thereto, said links being inclined upwardly from one to the other end thereof.

87. In a typewriting machine, the combination of type carriers, actuating devices therefor, said actuating devices being pivoted, finger keys at different points fore and aft of the machine and each pivoted to its actuating device in the rear of the pivot of said actuating device, and a system of intermediate actuating links interposed between said type carriers and the actuating devices operatively connected thereto, said links being inclined upwardly from front to rear of the machine.

88. In a typewriting machine, the combination of type carriers, finger keys therefor arranged in banks, intermediate links between said type carriers and finger keys and operatively connected thereto, said links being arranged at their forward ends in banks which conform substantially to the arrangement of the banks of finger keys and arranged to incline upwardly at their rear ends.

89. In a typewriting machine, the combination of type carriers, finger keys therefor arranged in banks, and intermediate links between type carriers and finger keys, and pivoted levers operatively connected to the finger keys and links, the pivotal centers of the levers of the keys of different banks being at different heights.

90. In a typewriting machine, the combination of type carriers, finger keys therefor arranged in banks, intermediate links between the type carriers and finger keys and pivoted levers of substantially uniform size operatively connected to the finger keys and links, the pivotal centers of the levers of the keys of different banks being at different heights and the points of connection between the levers and links for each bank of keys being at the same height.

91. In a typewriting machine, the combination of finger keys, type carriers, straight intermediate draw links between each of said finger keys and its associated type carrier, the links of each key moving in a single plane and the planes of movement of the links of the center keys being substantially vertical whereas the links of the keys upon opposite sides of the key-board move in converging planes.

92. In a typewriting machine, the combination of finger keys, type carriers, rows of actuating levers therefor, a pivot bearing in each of said levers, a removable pivot contained in each of said bearings, the levers of each row being alined when in the normal position and adjacent one to another, so that the removable pivot contained in each of said bearings is prevented from being withdrawn by the adjacent levers when the parts are in the normal position, and operative connections between the finger keys and type carriers and the actuating levers.

93. In a typewriting machine, the combination of finger keys, type carriers, rows of actuating levers therefor, a pivot bearing in each of said levers, a pivot having a half round head at one end thereof seated in the pivot bearing of each lever, the levers of each row being alined when in the normal position and adjacent one to another, so that the pivot contained in each of said bearings is by said adjacent levers prevented from being withdrawn when the parts are in the normal position, and operative connections between the finger keys and type carriers and the actuating levers.

94. In a typewriting machine, the combination of finger keys, substantially straight links which are actuated by the finger keys and have a substantially horizontal disposition, substantially vertically disposed links, each of which is substantially straight throughout its length and is operatively connected to a horizontally disposed link and type carriers operatively connected to said vertically disposed links, the path of movement of each set of coöperating links being in substantially the same plane.

95. In a typewriting machine, the combination of finger keys, substantially straight links which are actuated by the finger keys and have a substantially horizontal disposition, a two arm lever connected directly to each horizontally disposed link and a substantially vertically disposed link connected directly to each two arm lever and to a type carrier, the path of movement of each two arm lever and the links which coöperate therewith being in substantially the same plane.

96. In a typewriting machine, the combination of finger keys, type carriers, straight intermediate type carrier actuating links between each of said finger keys and its associated type carrier, the links of each key lying in a single plane, the plane of movement of said links of the center keys being substantially vertical whereas the links of the side keys lie in planes inclined relatively to one another.

97. In a typewriting machine, the combination of finger keys, type carriers, straight intermediate type carrier actuating draw links between each of said finger keys and its associated type carrier, the said links of each key lying in a single plane and the planes of movement of the links of the center keys being substantially vertical, whereas the links of the keys upon opposite sides of the keyboard move in converging planes.

98. In a typewriting machine, the combination of type carriers having upper and lower case characters with one type on each type carrier, a separate key for each type carrier, and an inking pad, the type carriers being disposed so that those carrying upper case types alternate with those carrying lower case types.

99. In a double case ink pad typewriting machine, the combination of circularly arranged type carriers having upper and lower case characters with one type on each carrier and in which those carrying upper case types alternate with those carrying the lower case types, a separate key for each type carrier, and a circular inking pad.

100. In a typewriting machine, the combination of a type bar, a jointed connection operatively connected to the type bar at one end and to a fixed point at its opposite end, and key actuated means positively connected to said jointed connection intermediate the ends of said jointed connection, the rear member of said jointed connection being substantially horizontally disposed and receiving a pull toward the front of the machine at each actuation.

101. In a typewriting machine, the combination of a set of type bars, a set of key actuating means for said type bars comprising a plurality of horizontal transversely arranged rods or bars supported in two rows, one above the other, a plurality of links mounted on said bars, and a plurality of key stems connected to said links at their free ends, the construction being such that each cross bar supports a plurality of bearings forming parts of said links.

102. In a typewriting machine, the combination of a type bar and actuating means therefor, said actuating means comprising a pair of pivoted devices whose pivotal axes are at different elevations and in a vertical plane parallel to the axis of the platen, and an upright link pivoted to each of said devices behind said plane.

103. In a typewriting machine, the combination of a type bar and actuating means therefor, said actuating means comprising a pair of pivoted devices whose pivotal axes are at different elevations and in a vertical plane parallel to the axis of the platen, an upright link pivoted to each of said devices behind said plane, and a finger key operative to actuate said link and devices.

104. In a typewriting machine, the combination of type bars, key actuated levers having elongated bearings, and links between said key actuated levers and the type bars, said links being pivoted to said levers at different points relatively to the lengths of said bearings and widthwise of the machine, the keys being arranged in straight rows fore and aft of the machine, the points of connection to said levers in each said row being stepped or in different vertical planes fore and aft of the machine.

105. In a typewriting machine, the combination of type bars, angular levers having elongated bearings extending widthwise of the machine, finger keys for said levers, and links between the type bars and angular levers, said links being pivotally connected to said angular levers at different points relatively to the lengths of the bearings of said levers.

106. In a typewriting machine, a type action comprising a type bar, and actuating means therefor, said actuating means including a finger key, a sub-lever, a connection from the sub-lever to the type bar, and a hanger for said sub-lever, said hanger having a pivotal adjustment relatively to the type bar to bring the plane of the sub-lever substantially in the plane of movement of the said connection between the sub-lever and type bar.

107. In a typewriting machine, a type action comprising a type bar, and actuating connections therefor, said actuating connections including a finger key, a sub-lever, a link between the sub-lever and the type bar, a link between the sub-lever and key, and a hanger for said sub-lever, said hanger having a pivotal adjustment relatively to the type bar to bring the plane of the sub-lever substantially in the plane of movement of the said link between the sub-lever and type bar.

108. In a typewriting machine, a type action comprising a type bar, and actuating means therefor, said actuating means including a finger key, a sub-lever that is mounted to swing in a plane inclined to a vertical plane extending fore and aft of the machine, a connection intermediate said sub-lever and type bar, and a hanger having a pivotal adjustment to bring the plane of the sub-lever substantially in the plane of movement of said intermediate connection.

109. In a typewriting machine, a type action comprising a type bar, and actuating means therefor, said actuating means including a finger key, an angular sub-lever that is mounted to swing in a plane inclined to a vertical plane extending fore and aft of the machine, a link intermediate said sub-lever and type bar, a hanger having a pivotal adjustment to bring the plane of the angular sub-lever substantially in the plane of movement of said intermediate link, and a link between said finger key and sub-lever.

110. In a typewriting machine, the combination of a series of type bars, a series of divergent links operatively connected therewith, a series of divergently arranged sub-levers connected with said links, the divergence of the links and levers bringing them in planes which are inclined to a vertical plane extending fore and aft of the machine and each of said links and its associated sub-lever moving substantially in the same plane, a series of keys, a series of links between said keys and sub-levers, the divergence of the sub-levers and first mentioned links compensating for the difference in width between the system of keys and the system of type bars.

111. In a typewriting machine, the combination of a series of keys, a series of type bars, a series of radially arranged links operatively connected with said type bars, a series of radially arranged sub-levers connected to said links, the radial arrangement of the links and levers compensating for the difference in width between the system of keys and the system of type bars and each radially arranged link and its associated sub-lever moving in the same radial plane, and links situated in substantially parallel vertical planes and connected with said keys and sub-levers.

112. In a typewriting machine, the combination of a series of type bars, a series of key actuated devices, a series of angular levers, and links connecting said angular levers with the type bars and with said key actuated devices, said angular levers being pivoted to swing in divergent planes, each plane extending through the points at which the corresponding links are connected to the associated type bar and key actuated device, whereby motion may be transmitted to each type bar through the divergently arranged angular lever without side strain notwithstanding that the width of the set of said key actuated devices exceeds that of the set of type bars.

113. In a typewriting machine, the combination of a series of type bars, a series of actuating devices for said type bars including sub-levers, individual hangers for said sub-levers, said hangers having stems, and means for affording an adjustment of each hanger around the longitudinal axis of its stem to vary the plane of movement of the associated sub-lever.

114. In a typewriting machine, the combination of a series of type bars, a series of actuating devices for said type bars including sub-levers, individual hangers for said sub-levers, said hangers having cylindrical posts or stems, and means for affording an adjustment of each hanger around the longitudinal axis of its cylindrical post or stem to vary the plane of movement of the associated sub-lever.

115. In a typewriting machine, the combination of a series of type bars, a series of actuating devices for said type bars including a series of angular sub-levers arranged in planes that are at an inclination to a vertical plane extending fore and aft of the machine, individual hangers for said angular levers, and means for affording an adjustment of each of said hangers around the longitudinal axis thereof.

116. In a typewriting machine, the combination of type bars, key actuated levers, some of which levers are laterally extended, and links between said key actuated levers and type bars, certain of said links being pivoted to said laterally extended levers at different widthwise points of said levers.

Signed at the borough of Manhattan, city of New York, in the county of New York, and State of New York, this 10th day of December A. D. 1901.

ARTHUR W. SMITH.

Witnesses:
K. V. DONOVAN,
E. M. WELLS.